United States Patent [19]
Ueda et al.

[11] Patent Number: 5,765,838
[45] Date of Patent: Jun. 16, 1998

[54] SEALING GASKET MADE OF EXPANDED GRAPHITE, WITH OPENED THIN-LEAF SURFACE STRUCTURE

[75] Inventors: Takahisa Ueda, Sanda; Masaru Fujiwara, Hyogo-ken; Terumasa Yamamoto, Osaka, all of Japan

[73] Assignee: Nippon Pillar Packing Co., Ltd., Osaka, Japan

[21] Appl. No.: 710,060

[22] Filed: Sep. 10, 1996

Related U.S. Application Data

[62] Division of Ser. No. 470,441, Jun. 6, 1995, Pat. No. 5,628,520.

[51] Int. Cl.⁶ .................................................. F16J 15/10
[52] U.S. Cl. ........................ 277/650; 277/652; 277/580
[58] Field of Search ............................. 277/227, 235 A, 277/233, DIG. 6

[56] References Cited

U.S. PATENT DOCUMENTS

| | | |
|---|---|---|
| 3,193,424 | 7/1965 | Scott . |
| 3,404,061 | 10/1968 | Shane et al. ............... 277/DIG. 6 |
| 3,600,289 | 8/1971 | Bragole . |
| 4,064,030 | 12/1977 | Nakai et al. . |
| 4,591,166 | 5/1986 | Atkinson et al. ............ 277/DIG. 6 |
| 4,615,763 | 10/1986 | Gelorme et al. . |
| 4,931,125 | 6/1990 | Volkmann et al. . |
| 4,956,226 | 9/1990 | Ashizawa et al. . |
| 5,154,977 | 10/1992 | Saito . |
| 5,462,781 | 10/1995 | Zukowski . |

OTHER PUBLICATIONS

Charles V. Cagle; "Adhesive Bonding Techniques and Applications"; p. 111, Oct. 4, 1972.

*Primary Examiner*—Scott Cummings
*Attorney, Agent, or Firm*—Jones, Tullar & Cooper, P.C.

[57] ABSTRACT

An expanded graphite sealing material is provided in which the adaptability of the principal face of an expanded graphite base member is improved, the bonding strength to a coating layer and the like can be increased, and the sealing properties can be enhanced. A method of producing such a sealing material, and a gasket sheet using the sealing material are also of concern. On at least a portion of a principal face of the expanded graphite base member in which expanded graphite particles are pressurized and integrated together, opened thin-leaf graphite portions are formed. The principal face of the expanded graphite base member having the thin-leaf graphite portions can be impregnated with a sealing member such as PTFE or covered with a coating layer. As the form of the sealing material, a sheet, a press-molded product, a fabric, a string, or a braided article can be adopted.

3 Claims, 15 Drawing Sheets

Fig. 17A

| Embodiment Nos. | MATERIAL | STRUCTURE | | |
|---|---|---|---|---|
| | | PRIMARY PROCESS | SECONDARY PROCESS | TERTIARY PROCESS |
| 1 | Expanded graphite sheet | Blasted with abrasive of particle diam. of 10 - 20 um | — | — |
| 2 | ← | ← | Impregnated with PTFE particles | — |
| 3 | ← | ← | ← | Cut into narrow strips, and die-molded with setting impregnated face inside |
| 4 | ← | ← | Impregnated with MEK solution in which NBR and graphite are dispersed | — |
| 5 | ← | ← | ← | Stamped into ring-like shape |
| 6 | ← | Cut into thin tapes and die-mold the tapes | Inner and outer faces are blasted | Blasted face is impregnated with PTFE |
| 7 | ← | ← | End face of ring is blasted | Blasted face is impregnated with PTFE, dried, and baked |
| 8 | Binder is applied to fiber and expanded graphite is pressurized | Surface is blasted with abrasive of particle diam. 10 -20 um | Impregnated with PTFE particles | — |
| 9 | ← | Strings are braided, and then surface is blasted | Impregnated with PTFE particles | — |
| 10 | ← | ← | Coated with silicon rubber | — |
| 11 | ← | Both faces are blasted with abrasive of particle diam. 10 - 20 um | Blasted face is impregnated with phenol resin | Bonded and cured by hot press (laminations of plural sheets) |
| 12 | ← | One face is blasted with abrasive of particle diam. of 10 - 20 um | ← | Stainless steel plate is interposed as reinforcing member |

| Embodiment Nos. | Effect (O indicates improvement) | | | | | | |
|---|---|---|---|---|---|---|---|
| | Low density of principal face | Bonding strength | Sealing property | Anticorrosive | Releasing property | Low friction | Color alteration |
| 1 | O | O | O | | | | |
| 2 | | O | O | O | O | O | O |
| 3 | | O | O | O | O | O | O |
| 4 | | O | O | O | O | | |
| 5 | | O | O | O | O | | |
| 6 | | O | O | O | O | O | O |
| 7 | | O | O | O | O | O | O |
| 8 | | O | O | O | O | O | O |
| 9 | | O | O | O | O | O | O |
| 10 | | O | O | O | O | O | O |
| 11 | | O | O | O | O | O | O |
| 12 | | O | O | O | O | O | O |

Fig. 17B

SEALING GASKET MADE OF EXPANDED GRAPHITE, WITH OPENED THIN-LEAF SURFACE STRUCTURE

This is a divisional of application Ser. No. 08/470,441 filed on Jun. 6, 1995 now U.S. Pat. No. 5,628,520.

BACKGROUND OF THE INVENTION

1. Field of the Invention

The present invention relates to a sealing material made of expanded graphite which is used in, for example, various kinds of sealing members for high-temperature use such as a packing, a gasket, a V-shaped ring, a valve seat, and a sliding material such as a bearing, or a heat insulating material for a high temperature vacuum furnace. The present invention relates also to a method of producing the sealing material, and to a gasket sheet.

2. Description of the Prior Art

Generally, rubber or a polytetrafluoroethylene resin (PTFE, the trade name is Teflon) has been used in various types of sealing members for high-temperature use. In recent years, sealing members made of expanded graphite which is superior in terms of heat resistance and the like have widely been developed and often used.

Expanded graphite is obtained by performing an expansion process on acid-treated graphite 1A having a thickness of HO and a laminate structure of flaky graphite particles 1a shown in FIG. 22. The expanded graphite consists as shown in FIG. 23 of a bellow-like expanded graphite structure 1 having a thickness H (about 5 to 10 mm) in which laminations of graphite particles 1a are opened in a laminate direction (a direction indicated by arrow a) so that a gap G is formed between the graphite particles 1a.

Such an expanded graphite structure 1 is used in, for example, a gasket sheet, a die-molded product of a sheet, a string-like material combined with a fiber, or a material obtained by braiding such materials.

As a gasket sheet, for example, known is a laminate processed article which is obtained in the following manner. Press molding or roll molding is performed for applying a pressure to the expanded graphite structure 1, so that the gaps G in the opened bellow-like structure 1 which has been described with reference to FIG. 23 is reduced or eliminated. Thus, the graphite particles 1a are again in contact with each other, thereby forming a sheet-like base member 201 as shown in FIG. 24 in which the graphite particles 1a are self-bonded to each other. Laminate members 202 and 202 made of a PTFE film are bonded to the upper and lower faces of the sheet-like base member 201 with a binder, respectively.

In addition, known materials include a sheet-like material obtained by applying a pressure to the expanded graphite structure in which a binder is mixed, by means of press molding or roll-pressurizing molding, and a material obtained by forming local embossed portions on the principal face of a sheet-like base member made of an expanded graphite structure by using an embossing roll or other tools, and then by bonding a foil or the like using a laminate process, or by coating a rubber material.

In the gasket sheet made of a conventional expanded graphite sealing material having the above-described structure, the sheet-like base member 201 is obtained by simply applying a pressure to the expanded graphite structure 1, so that the graphite particles 1a on the principal face side of the base member 201 are in a high orientation state with high density. As shown in FIG. 25, therefore, the crystal planes of the portion are closely in contact with each other under pressure substantially in parallel to the principal face.

Such a high orientation state exhibits a poor surface bonding property. In the case where a laminate member 202 made of a PTFE film or the like is to be bonded to the base member by a laminate process, it is difficult for the laminate member 202 of the PTFE film as shown in FIG. 24 or the binder to penetrate between the expanded graphite particles 1a1 in the high ostentation portion on the principal face side. This may easily cause the peeling of the laminate member 202 or the binder layer.

In addition, the above-described process for simply applying a pressure to the expanded graphite structure 1 cannot overcome inherent drawbacks of the expanded graphite structure 1 in that the airtight sealing property is poor (air leakage), the strength is low, and the principal face of the base member 201 is easily damaged.

If the gasket sheet is used in a sandwiched state between joint flanges, there arise further problems as follows. The laminate member 202 may be stuck to the joint flange face, or the components such as sulfur, and chlorine contained in the graphite particles 1a may attack and corrode the counterpart metal.

SUMMARY OF THE INVENTION

The present invention has been developed in view of the above-described circumstances.

It is an object of the present invention to provide an expanded graphite sealing material in which the adaptability of a contact face, and the like can be ensured, a method of producing the sealing material, and a gasket sheet.

It is another object of the present invention to provide an expanded graphite sealing material in which sticking to a flange face and the like can be prevented, from occurring, to a method of producing the sealing material, and to a gasket sheet.

It is a further object of the present invention to provide an expanded graphite sealing material in which a lining material laminated on a sheet-like base member made of an expanded graphite structure has a large peel strength, to a method of producing the sealing material, and to a gasket sheet.

It is a still further object of the present invention to provide an expanded graphite sealing material in which the corrosion of the counterpart metal can be prevented from occurring, a to method of producing the sealing material, and to a gasket sheet.

The expanded graphite sealing material according to the present invention which has been developed in order to attain the above-mentioned objects is provided with an expanded graphite base member in which expanded graphite particles are pressurized and integrated together. In the expanded graphite sealing material, raised and opened thin-leaf graphite portions are formed in at least a portion of a principal face of the expanded graphite base member. The present invention includes an expanded graphite sealing-material in which the principal face of the base member having the opened thin-leaf graphite portions is impregnated with a sealing member, provided with a coating layer, or applied with a binder. The expanded graphite sealing material according to the present invention may be in various types of forms such as a sheet, a press-molded product, a fabric, a string, and a braided article.

According to the expanded graphite sealing material of the present invention having the above-mentioned construction, opened thin-leaf graphite portions are formed by, for example, a micro blasting process, in a portion of a principal face of an expanded graphite base member in which expanded graphite particles are pressurized and integrated together. As a result, the high orientation state of expanded graphite in the principal face portion is reduced, so that the adaptability, the bonding strength, and the like of the principal face of the expanded graphite base member are ensured, and the bonding property is improved. Thus, the high orientation state of graphite in the principal face is suppressed, so that the adaptability and the bonding strength of the principal face are improved, and the sealing properties can be remarkably increased.

In the sealing material in which the principal face of the base member is impregnated with a sealing member, provided with a coating layer, or applied with a binder, the coating member or the binder enters gaps between the thin-leaf expanded graphite particles formed in the principal face by the blasting process, so that peel strength is increased due to the three-dimensional binding, and the sealing properties are significantly improved. The expended graphite particles are not exposed from the coating layer or the like, so that, in practical use, corrosion of the counterpart metal can be effectively prevented from occurring, and the releasing property is improved.

In addition, if the expanded graphite sealing material is in the form of a sheet, it can be cut into pieces having desired sizes, so that they can be used for various applications. If the expanded graphite sealing material is in the form of a press-molded product, a ring-shaped packing or bearing can easily be produced. If the expanded graphite sealing material is in the form of a string or a braided article, the size adjustment in the case where it is actually mounted as a packing or the like can easily be performed.

In the method of producing an expanded graphite sealing material according to the present invention, an expanded graphite base member is formed by pressurizing expanded graphite particles and integrating them together, and raised and opened thin-leaf graphite portions are then formed in a portion of a principal face of the base member by using at least one method selected from micro blasting, ultrasonic irradiation, laser irradiation, and plasma irradiation.

According to the production method, since the thin-leaf graphite portions are formed in a portion of the principal face of the base member by using at least one method selected from micro blasting, ultrasonic irradiation, laser irradiation, and plasma irradiation, desired thin-leaf graphite portions can be selectively and efficiently formed in the principal face of the base member.

The gasket sheet according to the invention is formed by laminating a plurality of the expanded graphite sealing materials via a binder applied to the principal faces thereof and integrating them together. In this case, reinforcing members may be interposed between the plurality of sealing materials, respectively.

According to the invention, a thick gasket sheet can easily be produced, and it is possible to obtain a gasket sheet having a large bending strength and a large strength against the tightening in a mounting process.

The means for forming the opened thin-leaf graphite portions is not limited to the micro blasting process. When the blasting process is to be employed, it is preferable to satisfy the following conditions.

Specifically, expanded graphite which is commercially produced has a size of 1 mm or less in the width direction (a direction indicated by arrow b in FIG. 23). In view of this, particles used for the blasting process preferably have a particle diameter of 1 mm or less. In consideration of the gap G between expanded graphite particles 1a (FIG. 23), particles having the particle diameter of 10 to 20 μm are preferably used for the blasting process. Examples of particles for the blasting process include SiC, glass beads, iron powder, walnut shell flour, and plastic beads.

As the coating member, PTFE is suitably used. In addition to PTFE, useful coating members include various synthetic resins such as epoxy, phenol, nylon, and polyethylene, or high-viscosity members such as various kinds of oils, e.g., silicon and fluorine. Such coating members are useful for improving the adaptability of the principal face.

As the sealing member with which the principal face is impregnated, a rubber solvent is useful in which various kinds of rubbers and graphite are dispersed in methyletylketone (MEK). The various kinds of rubbers include acrylonytrile-butadiene rubber (NBR) chloroprene rubber (CR), silicon rubber, ethylene-propylene-diene-methylene rubber, natural rubber, styrene rubber, and the like. These rubbers may be used also as the coating member.

Laminate minerals such as mica, talc, and flaky graphite, fibrous inorganics such as potassium titanate, sepiolite, and wollastonite, inorganic powders such as talc, calcium silicate, calcium carbonate, and kaolin, and chops of various kinds of inorganic fibers such as glass, ceramic, and carbon may be mixed into the coating member together with the binder. In such a case, sticking to a counterpart such as a flange face, and coating member creep can be more effectively prevented from occurring.

In addition, if sacrifice metals such as zinc and aluminum, greases such as petrolatum and wax, corrosion preventive oils such as amines, and passivation agents such as nitrite are mixed into the coating member, the corrosion of the counterpart metal can be more surely prevented from occurring.

BRIEF DESCRIPTION OF THE DRAWINGS

FIGS. 17A and 17B are tables showing the structures and effects of Embodiments 1 to 12 of the present invention;

DETAILED DESCRIPTION OF THE PREFERRED EMBODIMENTS

Hereinafter, embodiments of the present invention will be described with reference to the drawings.

Embodiment 1

Figure 1:
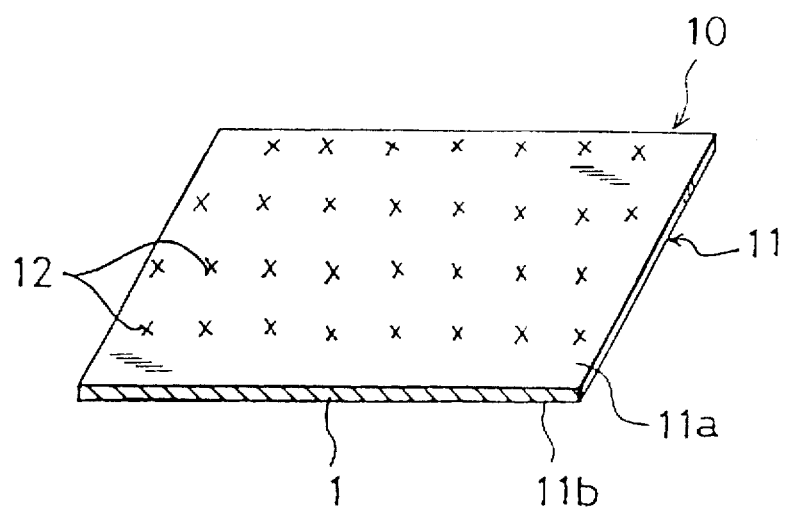
FIG. 1 is a schematic perspective view showing an expanded graphite sealing material according to Embodiment 1 of the present invention.
Figure 2:
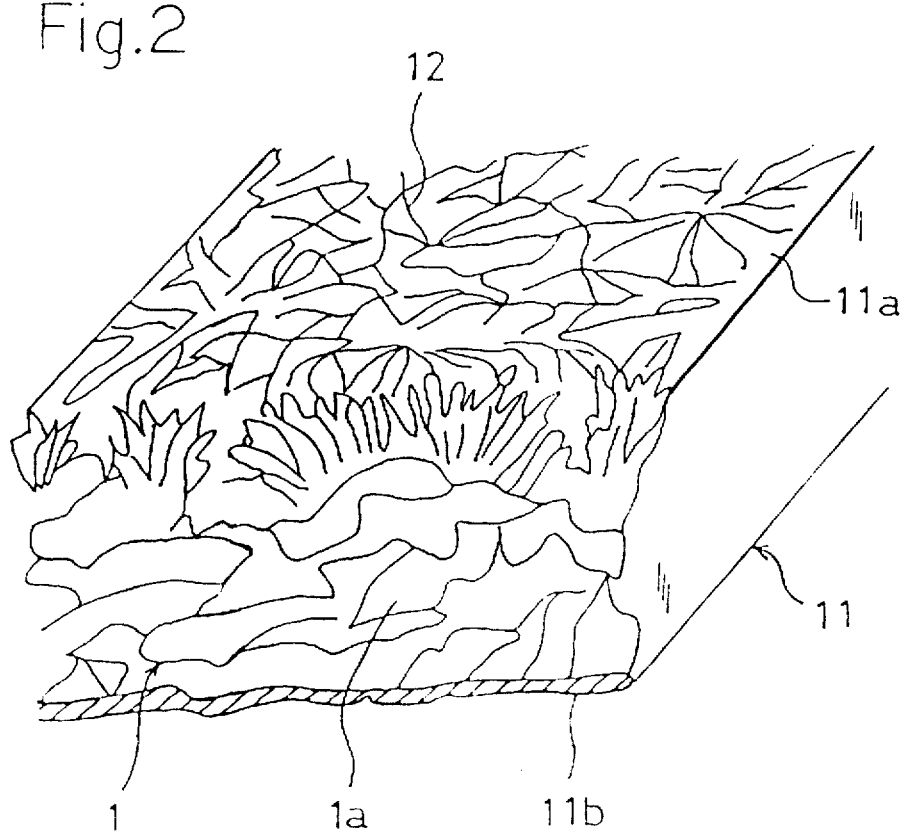
FIG. 2 is a perspective view in which a part of the sealing material in Embodiment 1 is shown in an enlarged cross section.

In FIG. 1, 10 designates a sheet-like sealing material made of expanded graphite. A base member 11 of the sealing material 10 is obtained by performing an expansion process as shown in FIG. 23 on acid-treated graphite 1A shown in FIG. 22, and by applying a pressure to graphite particles 1a to integrate them together. In FIG. 1, substantially the entire area of the principal face, e.g., the upper face 11a of the expanded graphite base member 11 is subjected to a micro blasting process by using an abrasive material such as SiC having a particle diameter of 10 to 20 μm, so that raised and opened thin-leaf graphite portions 12 are formed. That is, the high orientation state of the upper face 11a is reduced due to the opened thin-leaf graphite portions 12 as shown in FIG. 2, while the expanded graphite 1 in the lower face 11b to which the blasting process is not performed maintains the high orientation state.

Figure 3:
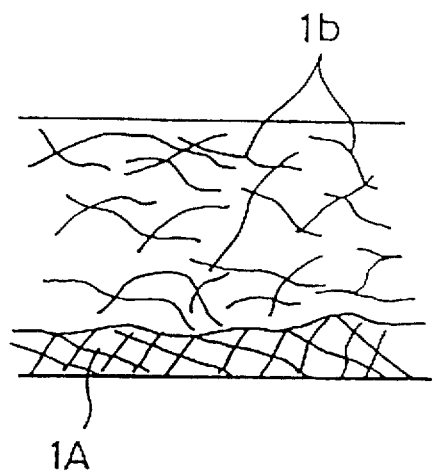
FIG. 3 is a view showing a crack caused on the surface of acid-treated graphite.
Figure 4:
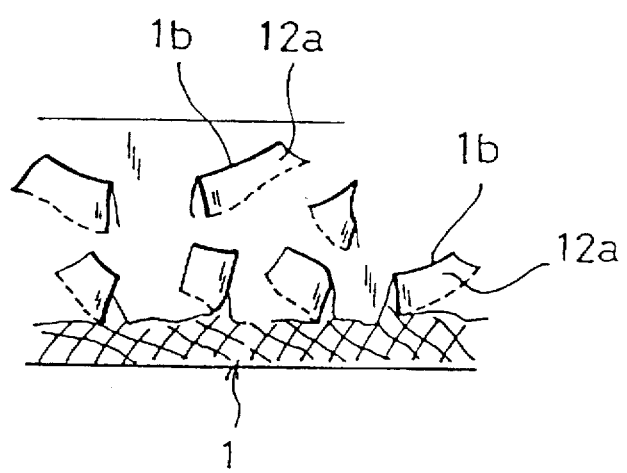
FIG. 4 is a view showing a condition in which thin-leaf graphite portions are formed on the surface of expanded graphite particles.
Figure 5:
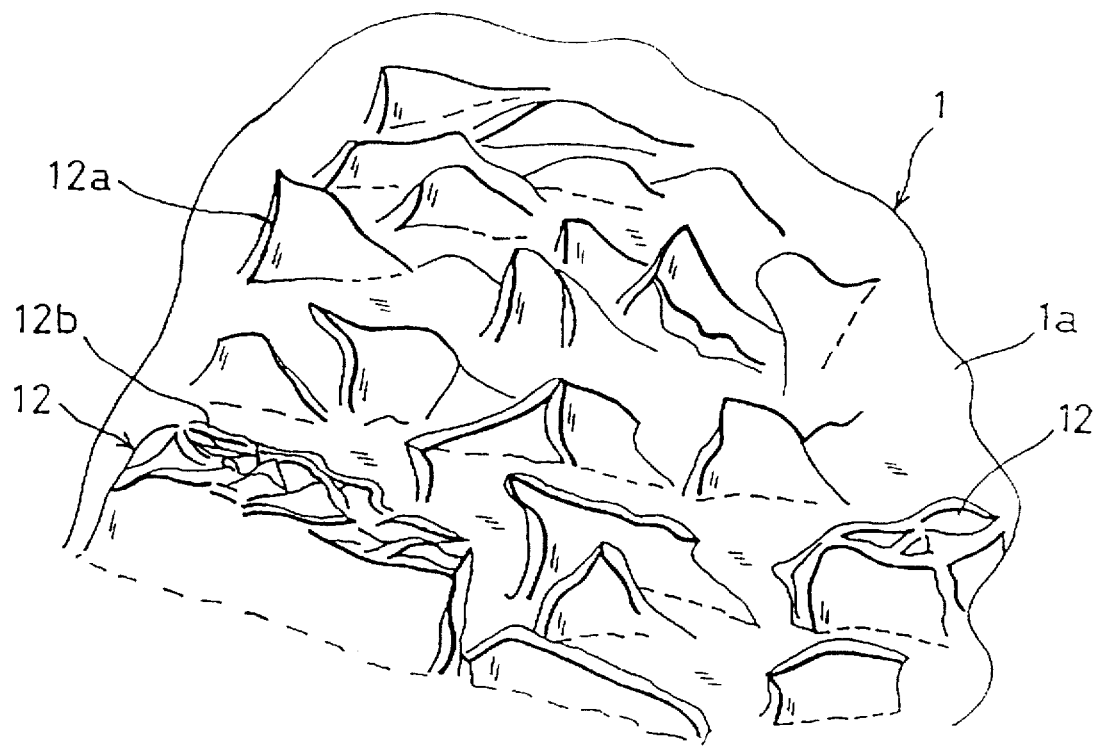
FIG. 5 is a perspective view in which the formation condition of the thin-leaf graphite portion is enlarged.
Figure 22:
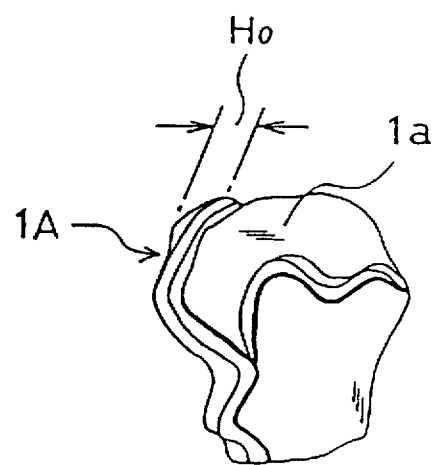
FIG. 22 is an enlarged view showing the condition before expansion of acid-treated graphite particles.
Figure 23:
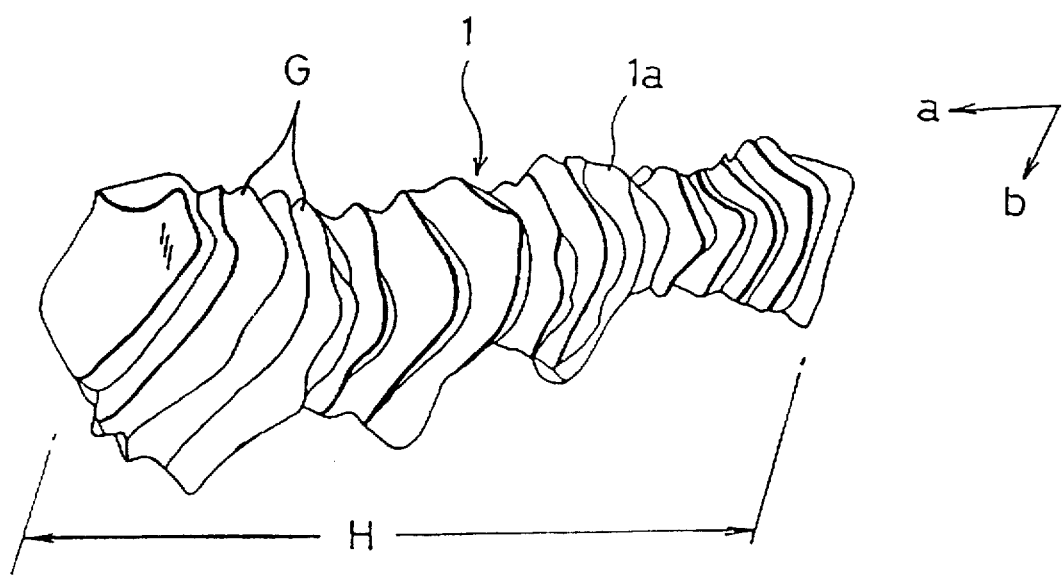
FIG. 23 is an enlarged perspective view showing expanded graphite particles.
Figure 24:
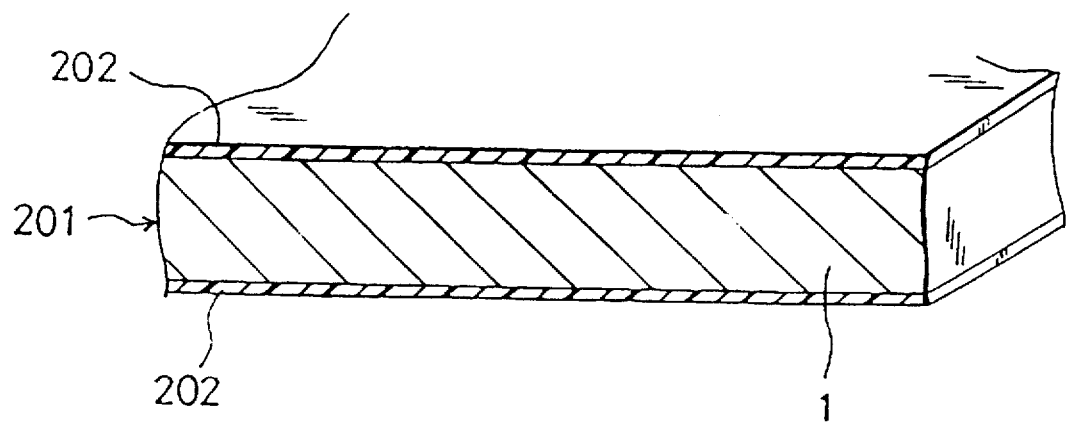
FIG. 24 is a perspective view in which a part of a gasket sheet using a conventional expanded graphite sealing material is shown in cross section.
Figure 25:
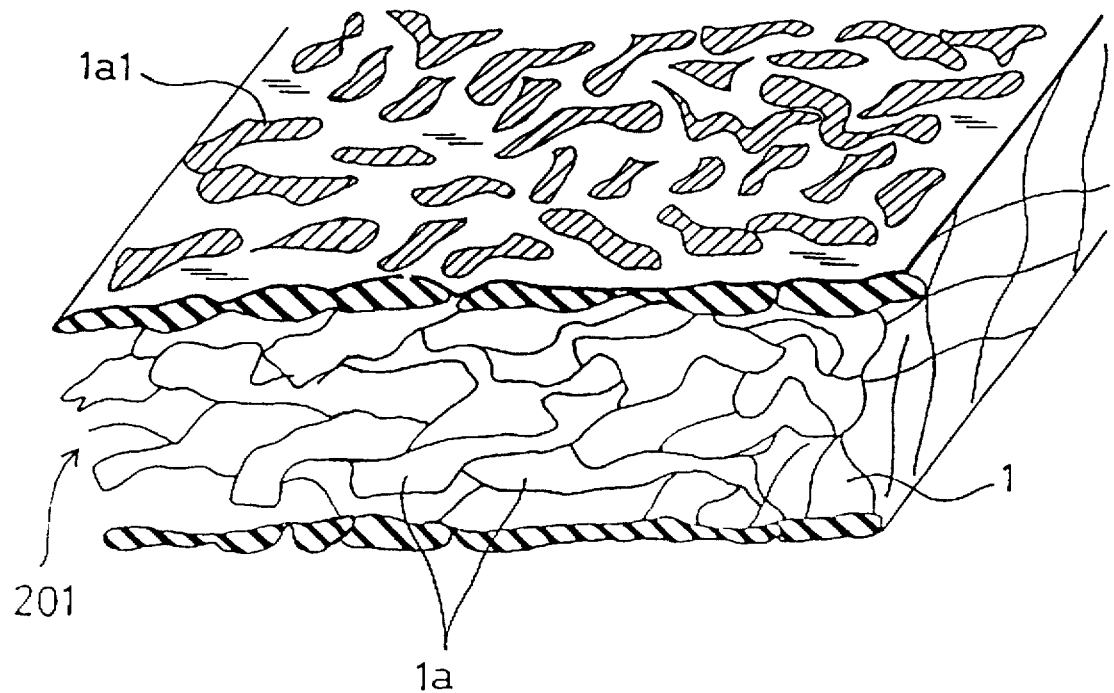
FIG. 25 is an enlarged perspective view showing a part of the principal face of a conventional expanded graphite base member.

On the surface of the acid-treated graphite 1A of FIG. 22, cracks 1b are produced as shown in FIG. 3. When the expansion process is performed, raised portions 12a of graphite having top ends at the cracks 1b are formed as shown in FIGS. 4 and 5. By the micro blasting process, in addition to the raised portions 12a, raised portions 12b which are relatively thick layers and in which gaps between layers are expanded (i.e., in a honeycomb shape) are formed. These portions constitute the thin-leaf graphite portions 12.

Specifically, in the sealing material of Embodiment 1, the thin-leaf graphite portions 12 are formed in the upper face 11a of the expanded graphite base member 11, so that the high orientation state can be reduced, and the adaptability of the principal face is improved. Accordingly, the sealing properties are improved, and the bonding strength is enhanced.

Embodiment 2

Figure 6:
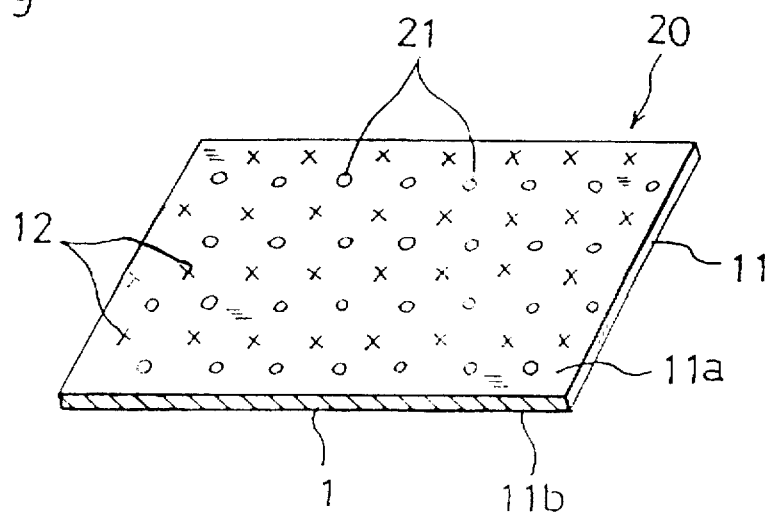
FIG. 6 is a perspective view schematically showing an expanded graphite sealing material according to Embodiment 2 of the present invention.

In FIG. 6, 20 designates a sheet-like sealing material made of expanded graphite. On the upper face 11a of a base member 11 of the expanded graphite sealing material 20, thin-leaf graphite portions 12 are formed in the same way as Embodiment 1. Thereafter, as a secondary process, the upper face 11a is impregnated or coated with a sealing member, for example, PTFE particles 21. In this case, the PTFE particles 21 enter the thin-leaf graphite portions 12 so as to establish a three-dimensional binding relationship, whereby the bonding strength is increased.

Due to the three-dimensional binding, the strength of the PTFE particles 21 is also increased, and the strength in the direction indicated by arrow a shown in FIG. 23 is remarkably increased as compared with that in the direction indicated by arrow b. Accordingly, sliding resistance is improved. An exposed area of the expanded graphite particles 1a is reduced by the PTFE particles 21, so that the probability of corrosion of the counterpart metal by the contained sulfur components can be eliminated, and the peeling property with respect to the contact face is improved. Color alteration can be easily attained by the PTFE particles 21. This is effective in the case where a marking or the like is required.

Embodiment 3

Figure 7:
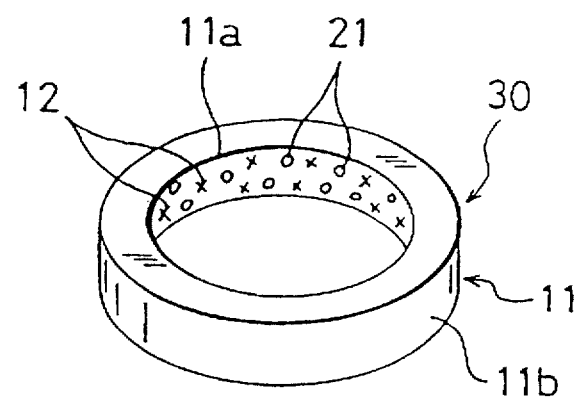
FIG. 7 is a schematic perspective view showing an expanded graphite sealing material according to Embodiment 3 of the present invention.

In FIG. 7, 30 designates a ring-shaped sealing material made of expanded graphite. This embodiment uses an expanded graphite base member 11 which is the same as that in Embodiment 2. The expanded graphite base member 11 is cut into narrow strips, and the strips are die-molded into a ring shape in which the inner face is a principal face 11a of the PTFE-impregnated face. Such a ring-shaped sealing material can directly be used as a bearing.

Embodiment 4

Figure 8:
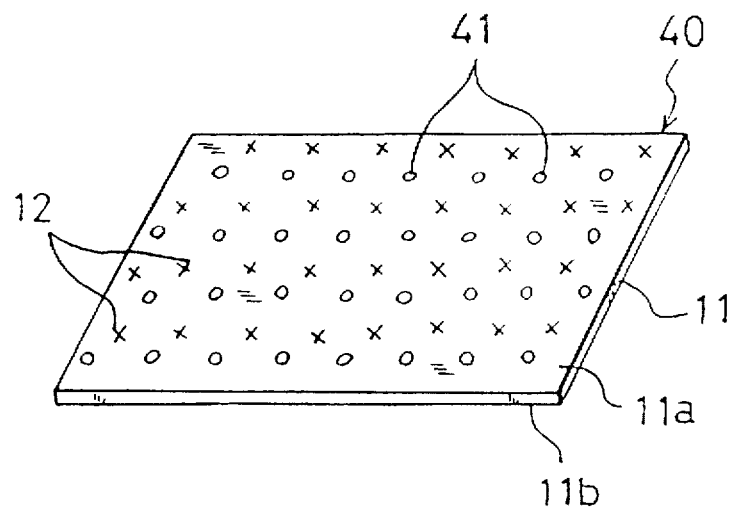
FIG. 8 is a schematic perspective view showing an expanded graphite sealing material according to Embodiment 4 of the present invention.

In FIG. 8, 40 designates a sheet-like sealing material made of expanded graphite. The sheet-like sealing material is obtained in the following manner. Instead of the PTFE particles, an upper face which is a principal face 11a of an expanded graphite base member 11 is impregnated with a solution 41 as the sealing member in which NBR and graphite are dispersed in a solvent such as MEK. Accordingly, the sealing member can easily enter the inside of the thin-leaf graphite portions 12.

Embodiment 5

Figure 9:
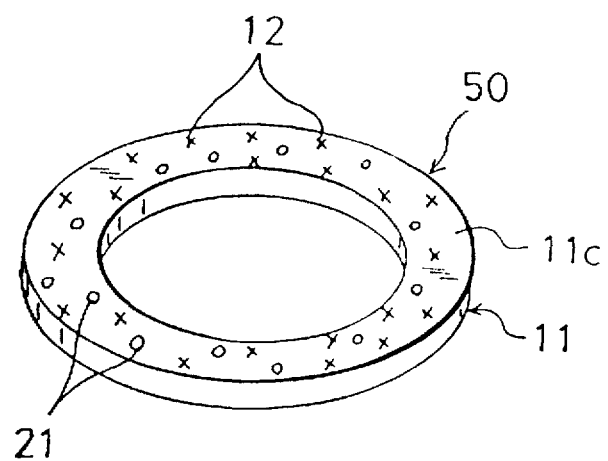
FIG. 9 is a schematic perspective view showing an expanded graphite sealing material according to Embodiment 5 of the present invention.

In FIG. 9, 50 designates a ring-shaped sealing material made of expanded graphite. The ring-shaped sealing material is formed by stamping the sheet-like sealing material 20 in Embodiment 2 into a ring shape. That is, the ring-shaped sealing material of this embodiment can be treated as a press-molded product. On an end face which is a principal face 11a, opened thin-leaf graphite portions 12 are formed, and the end face is impregnated with a sealing member 21 described in Embodiment 4.

Embodiment 6

Figure 10:
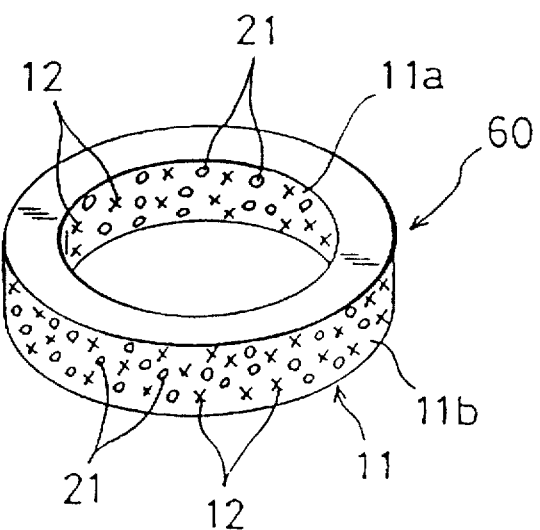
FIG. 10 is a schematic perspective view showing an expanded graphite sealing material according to Embodiment 6 of the present invention.

In FIG. 10, 60 designates a ring-shaped sealing material made of expanded graphite. The sealing material is obtained in the following manner. An expanded graphite base member 11 formed in the same way as Embodiment 1 is cut into tape-like pieces each having a predetermined narrow width. The tape-like pieces are die-molded into a ring shape. Thereafter, the outer face which is a principal face 11b and the inner face which is a principal face 11a of the ring-shaped base member 11 are subjected to the micro blasting process in the same manner as described above. As a result, opened thin-leaf graphite portions 12 are formed, and the blasting-processed faces are applied or impregnated with PTFE particles 21.

Embodiment 7

Figure 11:
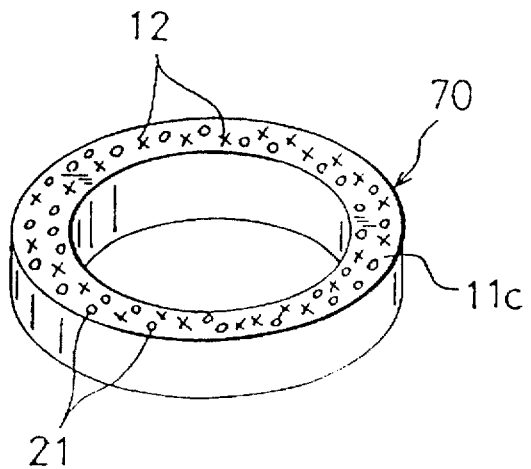
FIG. 11 is a schematic perspective view showing an expanded graphite sealing material according to Embodiment 7 of the present invention.

In FIG. 11, 70 designates a ring-shaped sealing material made of expanded graphite. The ring-shaped sealing material is obtained in the following manner. On an end face which is a principal face 11c of the ring-shaped base member 11 obtained as a result of the die-molding in Embodiment 6, thin-leaf graphite portions 12 are formed by a micro blasting process. Then, the face is impregnated with PTFE particles 21, dried, and then baked.

Embodiment 8

Figure 12:
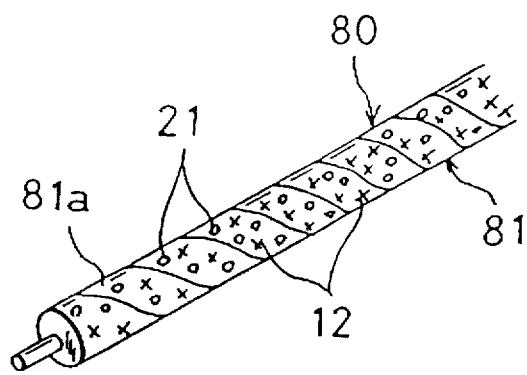
FIG. 12 is a schematic perspective view showing an expanded graphite sealing material according to Embodiment 8 of the present invention.

In FIG. 12, 80 designates a string-like sealing material made of expanded graphite. The string-like sealing material is obtained in the following manner. A binder is applied to a fiber, and then expanded graphite particles are applied to the surface thereof under pressure, so as to form a base member 81. On the surface which is a principal face 81a of the base member 81, opened thin-leaf graphite portions 12 are formed by the micro blasting process in the same way as described above. Then, the principal face 81a is impregnated with PTFE particles 21.

Embodiment 9

Figure 13:
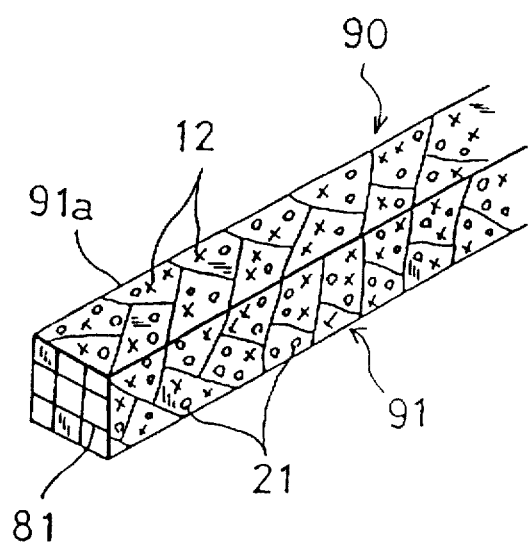
FIG. 13 is a schematic perspective view showing an expanded graphite sealing material according to Embodiment 9 of the present invention.

In FIG. 13, 90 designates a cord-like sealing material made of expanded graphite. The cord-like sealing material is obtained in the following manner. The base material produced in Embodiment 8 is braided, so as to form a base member 91. On a surface which is a principal face 91a of the base member 91, opened thin-leaf graphite portions 12 are formed by the micro blasting process in the same way as described above. Then, the principal face 91a is impregnated with PTFE particles 21.

Embodiment 10

Figure 14:
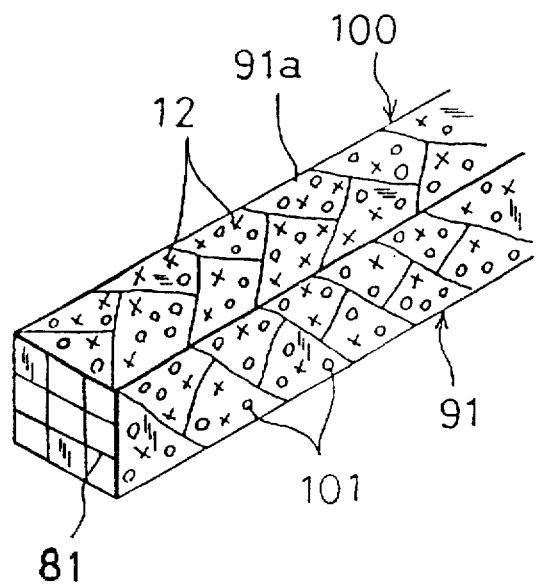
FIG. 14 is a schematic perspective view showing an expanded graphite sealing material according to Embodiment 10 of the present invention.

In FIG. 14, 100 designates a cord-like sealing material made of expanded graphite. In this embodiment, a surface which is a principal face 91a of the base member 91 obtained in Embodiment 9 is coated with a silicon rubber functioning as a sealing member 101, instead of the PTFE particles 21. The coating may be performed in the same way as Embodiment 4. The sealing material in Embodiment 8 has the string-like shape, and the sealing materials in Embodiments 9 and 10 have the cord-like shape. Accordingly, these embodiments have an advantage in that, for example, when the material is to be mounted as a ring-shaped gasket, the material can be cut into any desired length, and the length can be easily adjusted.

In Embodiments 1 to 10 described above, it is possible to use ultrasonic irradiation, laser irradiation, and plasma irradiation, instead of the micro blasting process. Also in such cases, raised and opened thin-leaf graphite portions can be formed.

Embodiment 11

Figure 15:
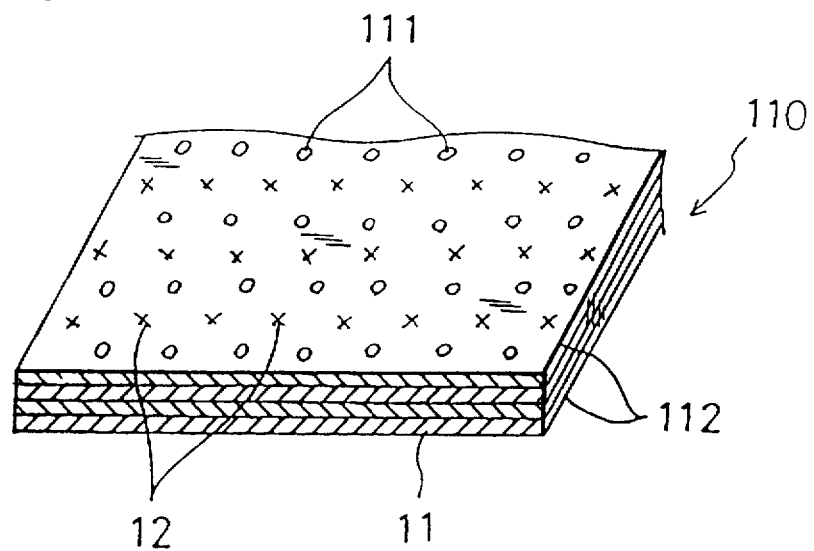
FIG. 15 is a schematic perspective view showing a gasket sheet using an expanded graphite sealing material according to Embodiment 11 of the present invention.

FIG. 15 shows a gasket sheet made of expanded graphite. This embodiment uses a sheet-like expanded graphite base member 11 which is the same as that in Embodiment 1. On the lower face 11b which is a principal face of the base member 11 and the upper face 11a which is a principal face, opened thin-leaf graphite portions 12 are formed by a micro blasting process. The blasting-processed faces are impregnated with a phenol resin functioning as a sealing member 111, so as to form a sheet-like sealing material. A plurality of such sealing materials 112 are stacked, and then subjected to a thermal pressing process. Thus, all the materials are joined and integrated into a unit.

In general, there exists only an expanded graphite sealing material having a thickness of about 0.1 to 1 mm. The bulk density $\{d(g/cm^3)\}$ of the expanded graphite particles 1a is in the range of 1/500 to 1/1000. In order to obtain a sheet having a density of about 1 $g/cm^3$ and having a relatively large thickness in the range of about 3 to 6 mm, it is required to perform the pressing process on a mat-like bulk of expanded graphite particles and having a thickness of about 3 to 5 m. This is impossible in practice. Accordingly, by adopting the construction of Embodiment 11, a gasket sheet having a relatively large thickness can easily be obtained.

Embodiment 12

Figure 16:
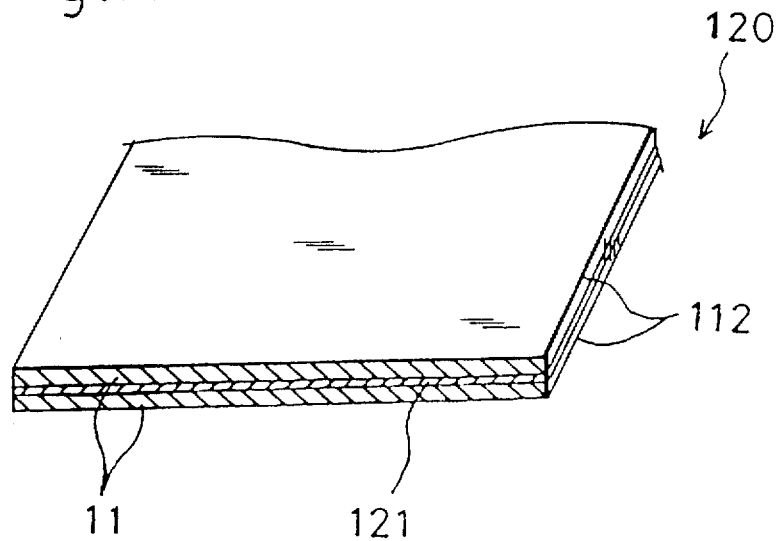
FIG. 16 is a schematic perspective view showing a gasket sheet using an expanded graphite sealing material according to Embodiment 12 of the present invention.

FIG. 16 shows a gasket sheet made of expanded graphite. This embodiment uses a sheet-like expanded graphite base member 11 which is the same as that in Embodiment 1. One face which is a principal face of the base member 11 is subjected to a micro blasting process in the same way as described above, so as to form thin-leaf graphite portions, and then impregnated with a phenol resin. A plurality of such sheet-like sealing materials 112, for example two materials are prepared. The material 112 is superposed on the other material 112 in such a manner that their blasting-processed faces are opposed and a reinforcing member 121 such as a stainless steel plate is interposed therebetween. Then, the whole structure is integrated together by a thermal pressing process. According to this embodiment, the mechanical strength in a mounted state is sufficiently ensured. In the gasket sheets 110 and 120, the upper and lower faces may be coated with PTFE, or the like.

In order to facilitate understanding of the structures of the Embodiments 1 to 12 and the effects which are deemed to be attained by these structures, they are collectively listed as tables in FIGS. 17A and 17B.

Figure 18:
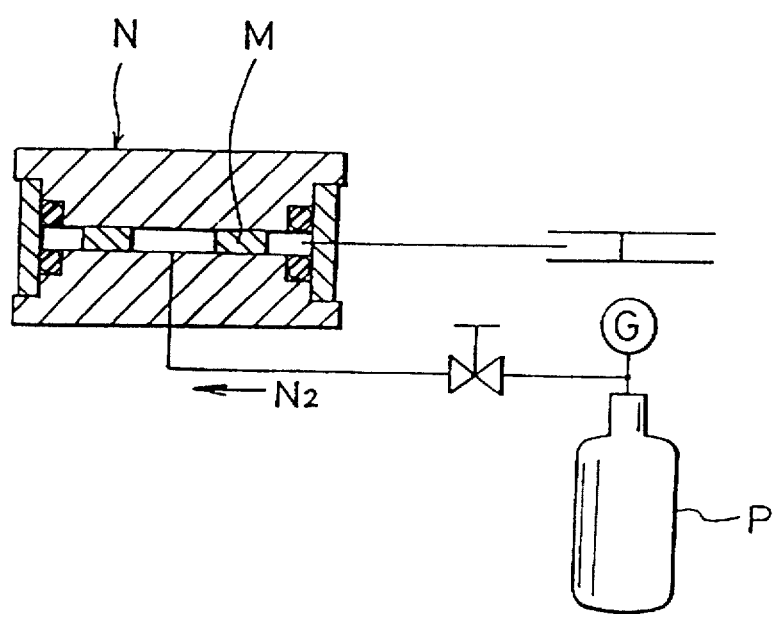
FIG. 18 is a diagram showing a configuration of an apparatus for measuring the leakage amount with respect to the tightening face pressure.

FIG. 18 shows an apparatus for measuring a leakage amount of a gasket sheet made of a sealing material of Embodiment 1 or 2, or the like. A sample M of such an embodiment is stamped into a size of 110×90 in diameter.

The stamped sample M is clamped by a leakage jig N, and compressed by an oil hydraulic press for attaining a predetermined tightening face pressure. Then, nitrogen gas $N_2$ is charged from a cylinder P into an inner side of the sample M up to a predetermined pressure. After an elapse of three minutes, the gas is recovered, and the leakage amount is measured from the amount of the recovered gas. The measurement results are shown in FIG. 19.

Figure 19:
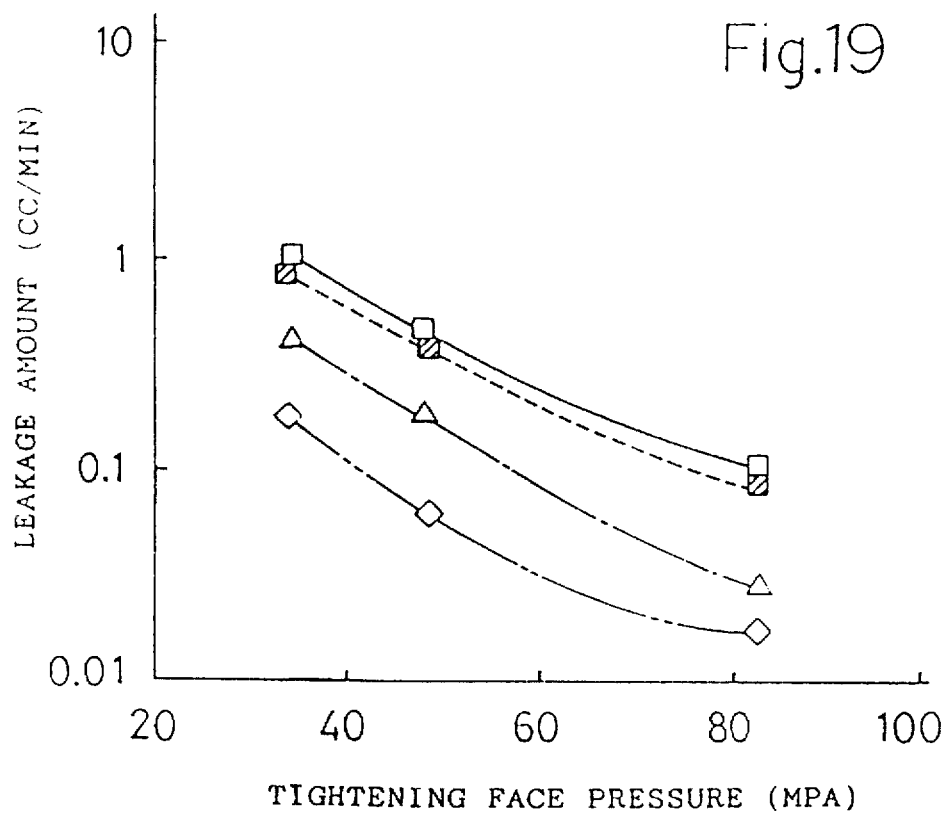
FIG. 19 is a characteristic diagram showing results of measurements of leakage amounts using the sealing materials according to Embodiments 1 and 2 as samples, in a comparative manner with that of a conventional material.

From the measurement results shown in FIG. 19, it is found that, in the sample according to Embodiment 1, the leakage amount can be suppressed to a level as low as that of a conventional expanded graphite sealing material. It is also found that, in the sample according to Embodiment 2 and the sealing material in which PTFE is baked, the leakage amount is greatly reduced as compared with the conventional material, and the sealing properties can be improved.

Figure 20:
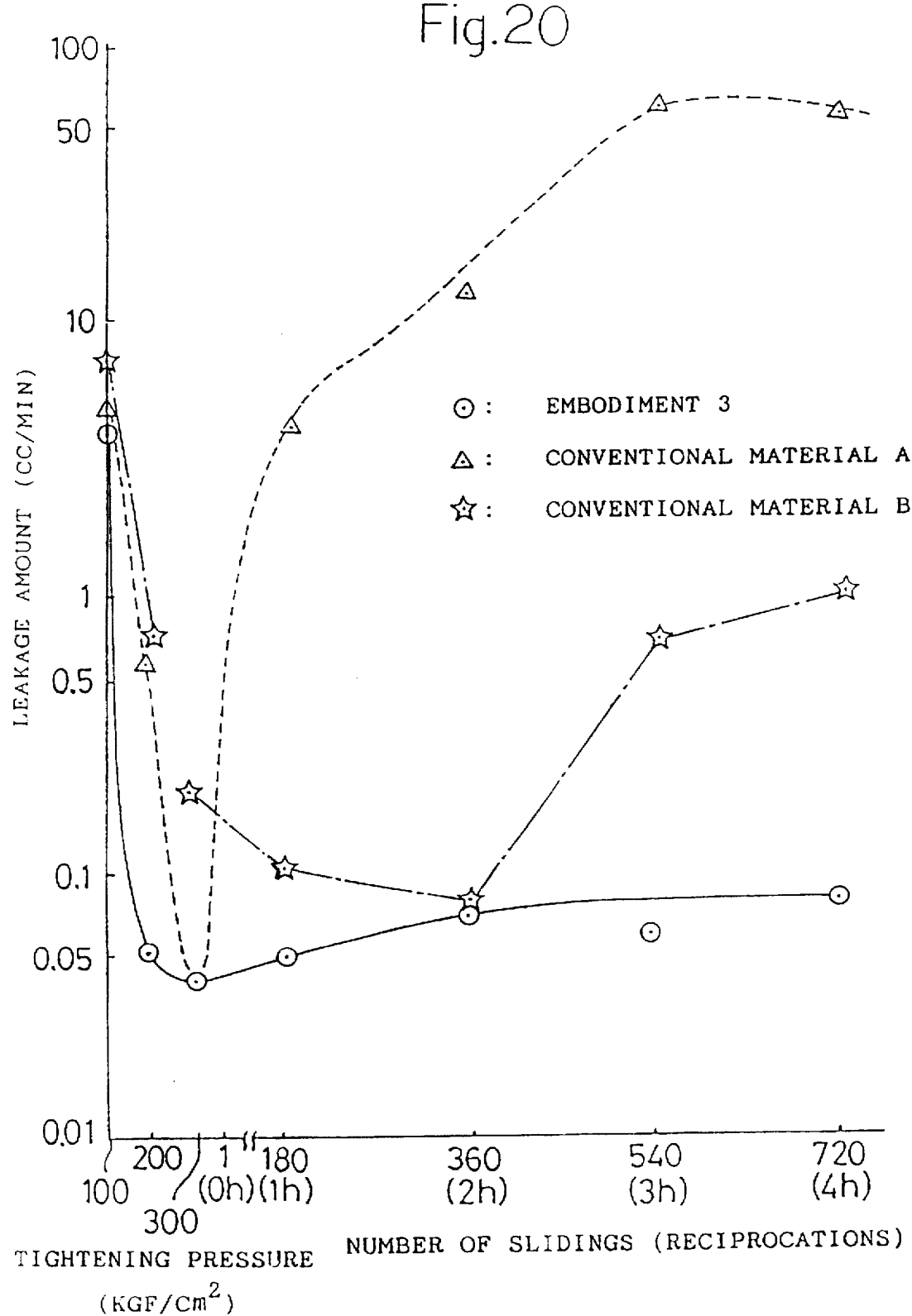
FIG. 20 is a characteristic diagram showing results of measurements of leakage amounts using the sealing material according to Embodiment 3 as a sample, in a comparative manner with that of a conventional material.

FIG. 20 is a characteristic diagram showing the results obtained by measuring the relationships between the number of sliding operations and the leakage amount in which a sample according to Embodiment 3 is used as a packing, in a comparative manner with those of conventional materials. A conventional material A is formed from an expanded graphite sealing material without having a metal mesh therein, and a conventional material B is formed by simply impregnating an expanded graphite sealing material with PTFE. For the conventional material A, the leakage amount is drastically increased from the beginning of the increase of the number of sliding operations. For the conventional material B, the leakage amount is remarkably increased after the number of sliding operations exceeds 360 (2 h). On the other hand, for the material according to Embodiment 3, it is found that, even when the number of sliding operations is increased, the leakage amount can be reduced to an extremely low level.

Figure 21:
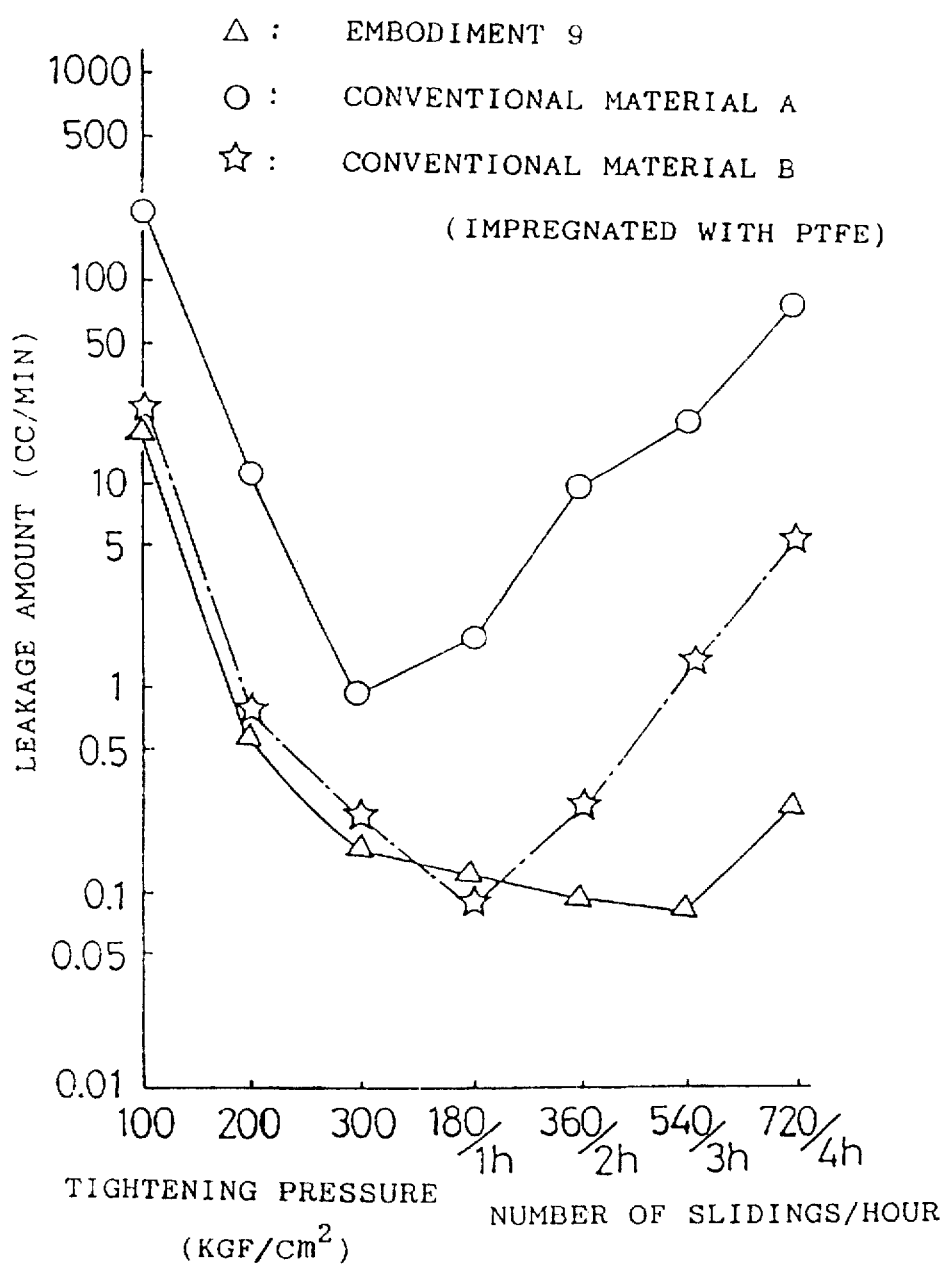
FIG. 21 is a characteristic diagram showing results of measurements of leakage amounts using the sealing material according to Embodiment 9 as a sample, in a comparative manner with that of a conventional material.

FIG. 21 is a characteristic diagram showing the results obtained by measuring the relationships between the number of sliding operations and the leakage amount in which a sample according to Embodiment 9 is used as a packing, in a comparative manner with those of conventional materials. A conventional material A is obtained by braiding a yarn in which expanded graphite is bonded to a cotton string with a binder. A conventional material B is impregnated with PTFE.

Also in this case, it is found that, as compared with the conventional materials A and B, the leakage amount is reduced and the sealing property can be improved for the material according to Embodiment 9.

What is claimed is:

1. A gasket sheet formed by laminating a plurality of expanded graphite sealing materials via a binder applied to principal faces of said materials and integrating said materials together said expanded graphite sealing material being provided with an expanded graphite base member which defines a principal face and in which expanded graphite particles are pressurized and integrated together, wherein raised and opened thin-leaf graphite portions are formed by using micro blasting in at least a portion of the principal face of said expanded graphite base member.

2. A gasket sheet according to claim 1, wherein reinforcing members are interposed between said plurality of sealing materials, respectively.

3. A gasket sheet according to claim 1, wherein said expanded graphite base member defines an upper surface and a lower surface, said upper surface having said raised and opened thin-leaf graphite portions formed which extend toward said lower surface, and wherein said lower surface has a high orientation state of expanded graphite which extends toward said upper surface.

\* \* \* \* \*